United States Patent
Gerini et al.

(10) Patent No.: US 12,503,985 B2
(45) Date of Patent: Dec. 23, 2025

(54) FUEL SYSTEM FOR A SPARK IGNITION ENGINE

(71) Applicants: FPT INDUSTRIAL S.P.A., Turin (IT); LANDI RENZO SPA, Reggio Emilia (IT)

(72) Inventors: Andrea Gerini, Turin (IT); Nicola Rapetto, Turin (IT); Andrea Bizzarri, Reggio Emilia (IT); Davide Barbati, Reggio Emilia (IT); Massimo Ferrera, Reggio Emilia (IT)

(73) Assignees: FPT INDUSTRIAL S.P.A., Turin (IT); LANDI RENZO SPA, Reggio Emilia (IT)

( * ) Notice: Subject to any disclaimer, the term of this patent is extended or adjusted under 35 U.S.C. 154(b) by 25 days.

(21) Appl. No.: 18/718,143

(22) PCT Filed: Dec. 7, 2022

(86) PCT No.: PCT/IB2022/061872
§ 371 (c)(1),
(2) Date: Jun. 10, 2024

(87) PCT Pub. No.: WO2023/105433
PCT Pub. Date: Jun. 15, 2023

(65) Prior Publication Data
US 2025/0043740 A1 Feb. 6, 2025

(30) Foreign Application Priority Data
Dec. 9, 2021 (IT) .................. 102021000030977

(51) Int. Cl.
*F02D 19/06* (2006.01)
*F02D 19/08* (2006.01)

(52) U.S. Cl.
CPC ...... *F02D 19/0692* (2013.01); *F02D 19/0628* (2013.01); *F02D 19/0644* (2013.01);
(Continued)

(58) Field of Classification Search
CPC .......... F02D 2200/021; F02D 19/0628; F02D 19/081; F02D 19/0647; F02D 19/0644; F02D 19/0692
See application file for complete search history.

(56) References Cited

U.S. PATENT DOCUMENTS 6,382,182 B1 * 5/2002 Green .................. F02M 43/04
123/406.75
9,765,717 B2 * 9/2017 Guerreiro .......... F02M 63/0275
(Continued)

FOREIGN PATENT DOCUMENTS

WO 2008000095 A1 1/2008

*Primary Examiner* — Kevin A Lathers
(74) *Attorney, Agent, or Firm* — Bayramoglu Law Offices LLC

(57) ABSTRACT

A methane and hydrogen injection device is provided. The methane and hydrogen injection device includes a first methane injector, a second hydrogen injector, a single common injection pipe. The injectors are associated together so as to produce a mixture of methane and hydrogen with a variable concentration ratio, and the common injection duct is shaped to be operatively connected to an intake manifold of a spark-ignition internal combustion engine.

10 Claims, 2 Drawing Sheets

(52) U.S. Cl.
CPC ....... *F02D 19/0647* (2013.01); *F02D 19/081* (2013.01); *F02D 2200/021* (2013.01); *F02D 2200/0414* (2013.01)

(56) References Cited

U.S. PATENT DOCUMENTS

| | | |
|---|---|---|
| 2002/0002967 A1 | 1/2002 | Paul et al. |
| 2004/0250797 A1* | 12/2004 | Shetley ................ F02D 19/066 123/527 |
| 2007/0175459 A1 | 8/2007 | Williams et al. |

* cited by examiner

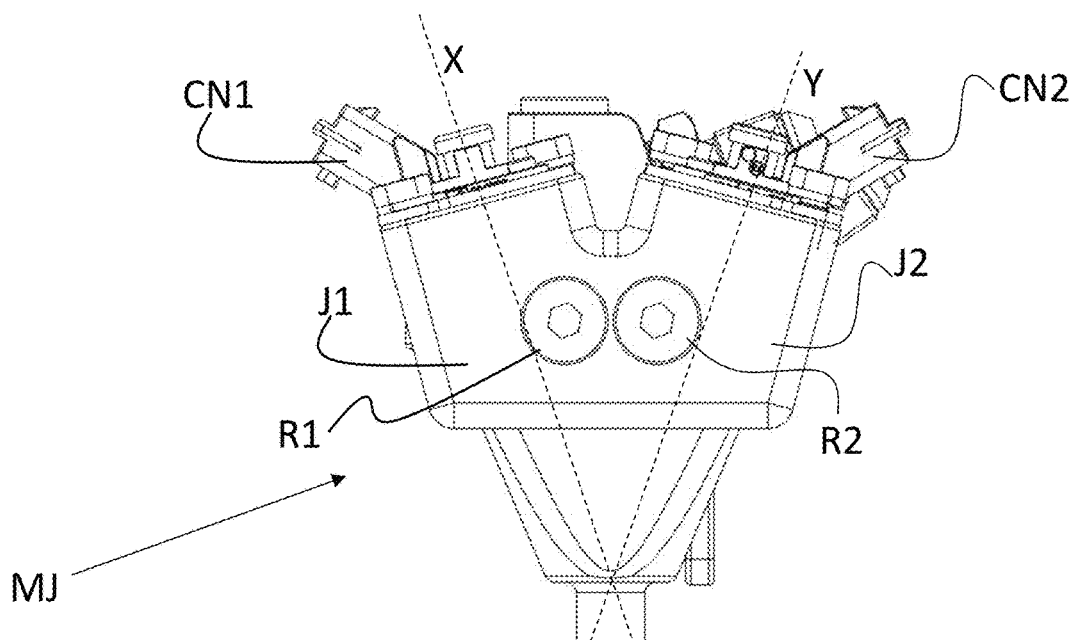
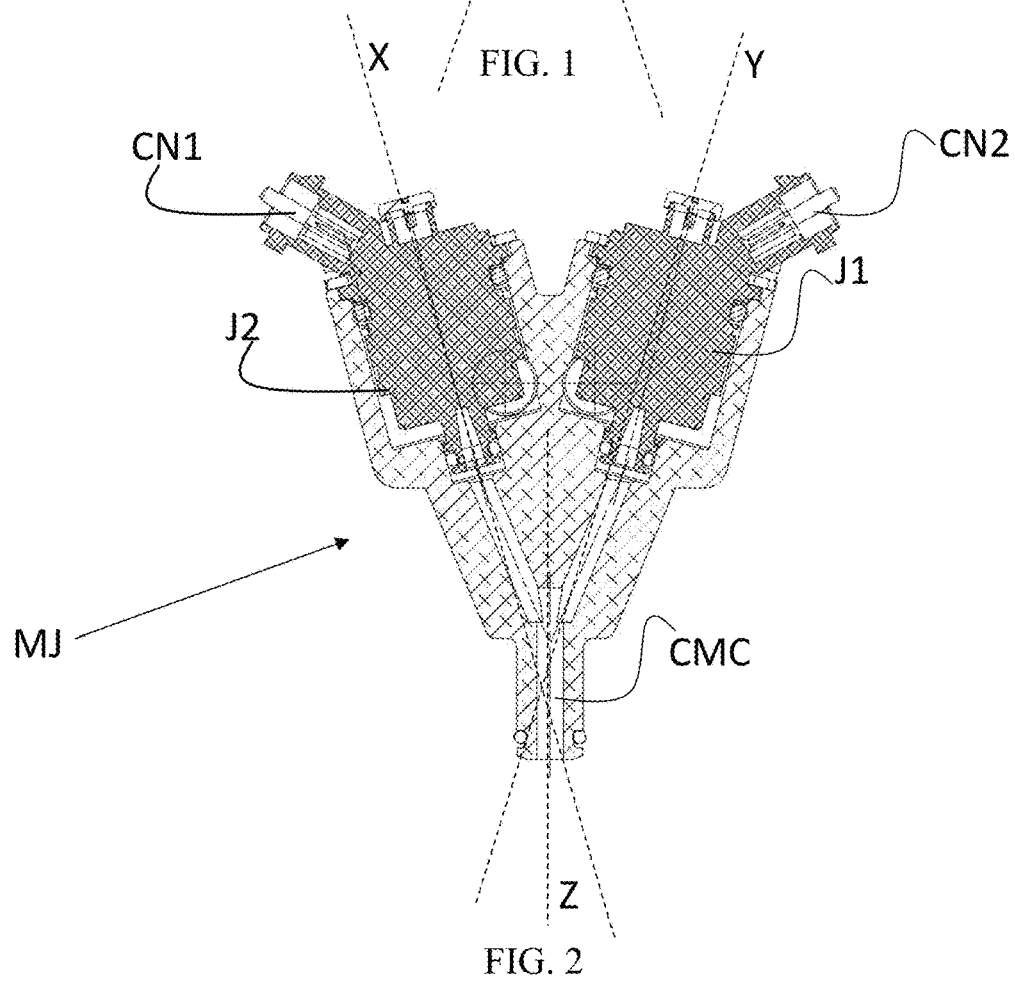
FIG. 1
FIG. 2

FUEL SYSTEM FOR A SPARK IGNITION ENGINE

CROSS-REFERENCE TO THE RELATED APPLICATIONS

This application is the national phase entry of International Application No. PCT/IB2022/061872, filed on Dec. 7, 2022, which is based upon and claims priority to Italian Patent Application No. 102021000030977, filed on Dec. 9, 2021, the entire contents of which are incorporated herein by reference.

TECHNICAL FIELD

The present invention relates to the field of spark ignition engines and in particular to fuel supply systems.

BACKGROUND

Hydromethane is a gaseous mixture composed of 10%-30% by volume of hydrogen and 70%-90% by volume of methane, mainly used in the automotive field as fuel. The presence of hydrogen helps to improve engine combustion efficiency and reduce CO2 equivalent and NOx emissions into the atmosphere, as hydrogen is a clean energy source.

Both the methane gas and the hydrogen gas constituting hydromethane can be produced biologically or through synthesis processes, increasing the use of renewable energy sources and further contributing to the decarbonisation objectives of the automotive field.

Given the properties of hydromethane, it was thought in the past to distribute methane with added hydrogen at about 10% by volume, to exploit the advantages of the mixture. This artificially generated hydromethane is generally referred to as "industrial hydromethane".

However, the diffusion of hydromethane is poor and the percentages of hydrogen are not constant.

In view of a greater diffusion of the hydrogen vector in the energy system, the gas distribution system envisages a partial use of the methane gas networks to inject hydrogen and in this way be able to convey it from the point of production to the point of use. Recent studies have demonstrated the compatibility of low pressure methane gas distribution networks up to hydrogen percentages of the order of 10-15% (by volume).

It is therefore possible that in the future the gas distribution system will contain this type of mixture.

However, this approach is still unclear at European level, neither in terms of timing nor in terms of location of the hydrogen injection points.

From the point of view of use through the automotive system, this approach is therefore still highly uncertain.

Furthermore, considering the case of using methane in liquid form (LNG), it is not possible to mix hydrogen in the liquefied methane due to the different liquefaction temperatures. Therefore, currently, it is not possible to predict a capillary diffusion of hydromethane.

Unless specifically excluded in the detailed description that follows, what is described in this chapter is to be considered as an integral part of the detailed description.

SUMMARY

The object of the present invention is to propose a solution to the problems inherent in the use of hydromethane.

The basic idea of the present invention is to propose a methane and hydrogen injection system so that the hydromethane mixture is created directly on board the vehicle during its combustion.

More particularly, according to the present invention, each cylinder is associated with two injectors, a first injector of which is arranged to inject methane in gaseous form and a second injector arranged to inject hydrogen in gaseous form.

It is clear that the two species of methane and hydrogen are stored separately on board the vehicle using separate accumulation tanks.

According to the present invention, the two injectors are associated together so as to inject the respective species into a common injection channel, able to be operatively associated with the intake manifold of the relative cylinder.

The common injection channel is a distinct and separate component from the intake manifold, therefore, the mixing of methane and hydrogen takes place in the common channel. Furthermore, it is understood that the power supply to the engine is indirect, as the common duct is not connected directly with the engine head, but indirectly through the intake manifold.

Each injector of the multi-species injector defines a development axis, so that the development axis of one injector is incident with the development axis of the other injector defining a Y configuration in combination with the common injection channel.

According to a preferred variant of the invention, the common injection channel is made in a body which is in one piece with the casings of the two injectors defining a Y-shaped multi-species injection device.

The multi-species injection device can be associated directly with the relevant intake manifold or via an optionally flexible extension.

According to a preferred implementation of the invention, an internal combustion engine comprises at least one multi-species injection device. More particularly, the multi-species injection device defines a containment plane and in which the containment plane is perpendicular to or incident with a crankshaft of the internal combustion engine when operatively associated with the internal combustion engine.

Advantageously, the multi-species injection system allows not only to simplify the assembly of the internal combustion engine, but also allows to limit the dimensions of the injection system.

When the internal combustion engine comprises two or more cylinders arranged in line, the corresponding two or more multi-species injection systems share two rails for the distribution of the two fuels, preferably arranged parallel to the crankshaft of the internal combustion engine.

According to a further preferred aspect of the invention, the ratio between methane and hydrogen has varied over time as a function of some factors:

Operating point of the engine,
Ambient temperature and/or engine coolant temperature,
Characteristics of methane,
Fuel levels in methane and hydrogen tanks.

Therefore, in at least one operating condition of the engine both gaseous species are injected simultaneously but with a ratio which varies over time.

In fact, the concept of a mixture implies that both gaseous species must be present.

The dependent claims describe preferred variants of the invention, forming an integral part of the present description.

BRIEF DESCRIPTION OF THE DRAWINGS

Further objects and advantages of the present invention will become clear from the detailed description that follows of an embodiment of the same (and of its variants) and from the annexed drawings given for purely explanatory and non-limiting purposes, in which:

FIGS. 1 and 2 show an embodiment of a multi-species injection device respectively according to a side view and according to a corresponding longitudinal section;

The same reference numbers and letters in the figures identify the same elements or components or functions.

Figure 3:
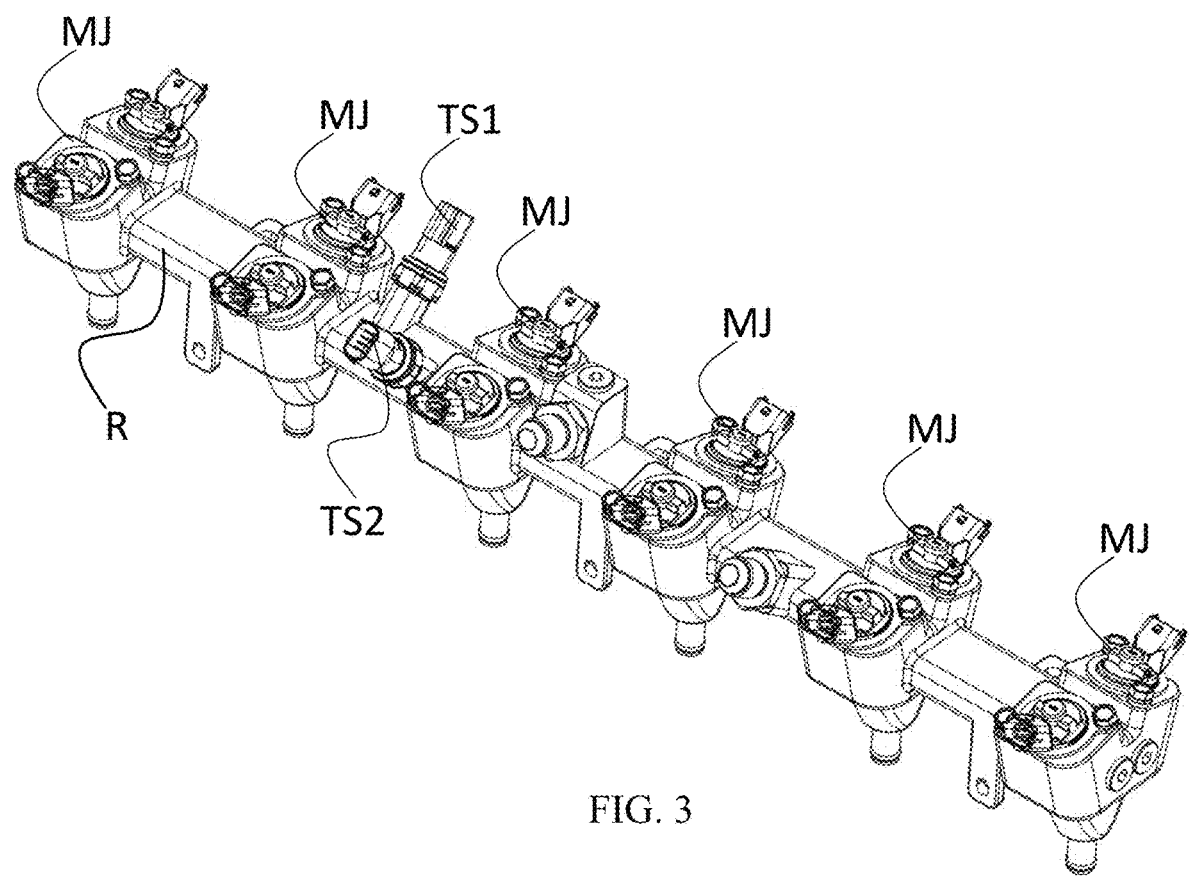
FIG. 3 shows a perspective view of a group of multi-species injectors according to the previous figures of an internal combustion engine.
Figure 4:
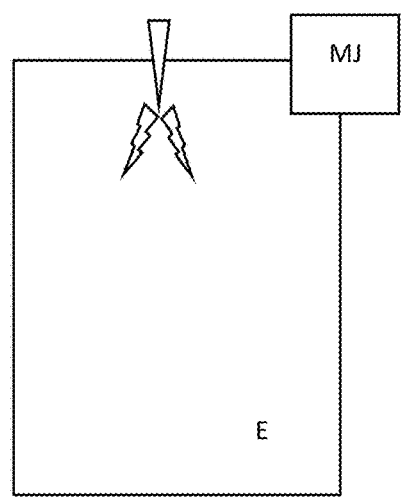
FIG. 4 shows a spark ignition engine implementing a device according to FIGS. 1-3.

It should also be noted that the terms "first", "second", "third", "superior", "inferior" and the like may be used herein to distinguish various items. These terms do not imply a spatial, sequential, or hierarchical order for the modified items unless specifically indicated or inferred from the text.

The elements and characteristics illustrated in the various preferred embodiments, including the drawings, can be combined with each other without however departing from the scope of protection of the present application as described below.

DETAILED DESCRIPTION OF THE EMBODIMENTS

FIG. 1 shows an example of a multi-species injection MJ device according to the present invention. In particular, it is configured for the injection of two different gaseous species.

It comprises a pair of injectors J1, J2 associated together so as to produce a hydromethane mixture directly on board the vehicle during its combustion.

In other words, the mixture produced is in no way stored for later use. The mixture produced is injected directly into the intake manifold of a cylinder during its operation, in order to burn it.

It is also worth noting that an injector cannot be confused with a simple valve, as the injector is responsible for dosing the fuel over time, also making multiple injections in the same engine power cycle. Indeed, a simple valve does not have the characteristics to open and close as quickly as an injector.

The first injector J1 is arranged to inject methane in gaseous form, while the second injector J2 is arranged to inject hydrogen in gaseous form.

According to the present invention, the two injectors are associated together so as to inject the respective species into a common injection channel CMC, able to be operatively connected to the intake manifold of the relative cylinder.

As can be seen in FIGS. 1 and 2, each injector J1 and J2 defines a development axis, respectively X and Y, so that the development axis of the first injector J1 is incident with the development axis of the second injector J2, defining a configuration V-shaped. More specifically, according to a preferred variant of the invention, the injectors define a Y-shaped configuration with the common injection channel CMC.

Preferably, the angle between the X-axis and the Y-axis is between 10° and 90°.

At the free ends of the V configuration there are electrical connectors CN1 and CN2, which allow to independently control the operation of the respective injectors J1 and J2.

The common channel CMC can have any shape. It is connected to injectors J1 and J2 at the vertex defined by the point of incidence of straight lines X and Y. It can have a straight or curved shape. Preferably, it has a rectilinear shape and the relative development axis is the bifield of the angle identified by the intersection of the X and Y axes.

However, the development axis Z of the common channel CMC can coincide with the X axis or with the Y axis.

If we consider a containment plane in which the X and Y axes lie, the Z axis of the common channel can also belong to the same plane or it can be incident with it.

According to a preferred variant of the invention, the common injection channel is made in a body, which is in one piece with the casings of the two injectors.

The common injection channel of the multi-species injection device can be associated directly with the relative intake manifold or by means of an optionally flexible extension.

With reference to FIG. 1, the body of the device MJ comprises a first port R1 and a second port R2 intended to be connected to respective distribution rails of the two types. The doors are perpendicular to the containment plane identified by the X and Y axes.

According to a preferred implementation of the invention, an internal combustion engine comprises at least one multi-species injection device. More specifically, the X and Y axes of the multi-species injection device identify a containment plane which can be perpendicular to or incident with the crank shaft of the internal combustion engine when operatively associated with the engine itself.

Advantageously, the multi-species injection system allows not only to simplify the assembly of the internal combustion engine, but also allows to limit the dimensions of the injection system.

When the internal combustion engine comprises two or more cylinders arranged in line, the corresponding two or more multi-species injection systems are arranged so that the relative planes identified by the X and Y axes are parallel to each other.

This fact makes it possible to adopt two ducts (rails) for the distribution of the two fuels that are perfectly straight and arranged parallel to each other and to the crankshaft of the internal combustion engine.

According to another aspect of the present invention, the hydromethane mixture is varied over time in relation to the operating conditions of the vehicle.

It is known that hydrogen has a much lower resistance to detonation than methane; the latter has an equivalent octane number closely linked to the composition of the distributed methane.

By virtue of these differences in the combustion properties of the two species, it can be expected to operate the internal combustion engine with a mixture rich in hydrogen:
1) at minimum (idle)
2) in cruising conditions with torque output lower than a pre-set percentage (e.g. 35%) of the maximum torque output,
3) in conditions of very cold intake air and/or still cold engine water.

Conversely, when the temperature of the engine and/or ambient air and/or the engine rotation speed exceeds a predetermined threshold, it is advantageous to limit the percentage of hydrogen so as to guarantee an adequate average octane number.

According to another preferred aspect of the invention, the addition of hydrogen depends on the quality of the methane. Hydrogen is known to help improve combustion. It is also known that pure methane does not exist and that the presence of heavier hydrocarbons (e.g. ethane, propane) and/or inert gases (e.g. N2, CO2) can lead to variations in its resistance to detonation.

It is worth highlighting that in the context of the present invention when we speak of a mixture we always refer to a mixture of hydrogen and methane, neglecting the fact that methane in itself represents a mixture of other species.

Therefore according to one aspect of the invention, the percentage of hydrogen injected into the engine can vary in relation to the availability of the two species.

In fact, if the residual amount of methane is limited, to extend the vehicle's range it is possible to increase the percentage of injected hydrogen up to the maximum design limit. Conversely, when the residual quantity of hydrogen is limited, the percentage of injected hydrogen can be reduced or cancelled.

Obviously, in relation to the percentage of injected hydrogen, the ignition times can be suitably varied taking into account the different composition of the mixture entering the engine.

The management of the species injected into the engine is achieved by means of an ECU processing unit, which controls the internal combustion engine and its subsystems.

The processing unit is arranged and connected with each multi-species injector so as to be able to selectively and independently control the operation of the methane injector and the hydrogen injector.

FIG. 3 shows a group of multi-species injectors according to the present invention interconnected by means of the duct R, generally referred to as the rail. Preferably, it houses two separate and parallel ducts to convey hydrogen and methane. Two temperature sensors TS1 and TS2 are associated with the rail to measure the temperature of the two fuel species for the purpose of regulating the combustion and mixing parameters of the same species immediately before the relative combustion.

Variants of the non-limiting examples described are possible, without however departing from the scope of protection of the present invention, including all embodiments equivalent, for a person skilled in the art, to the content of the attached claims.

From the description given above, the person skilled in the art is capable of realizing the object of the invention without introducing further constructive details.

What is claimed is:

1. A methane and hydrogen injection device comprising
a first methane injector,
a second hydrogen injector,
a single common injection duct,
wherein the first methane injector and the second hydrogen injector are associated together to produce a mixture of methane and hydrogen with a ratio between a concentration of hydrogen and methane, the concentration of hydrogen and methane varies over time, and the single common injection duct is shaped to be operatively connected with an intake manifold of a spark ignition internal combustion engine.

2. The methane and hydrogen injection device according to claim 1, wherein each of the first methane injector and the second hydrogen injector defines a development axis, wherein the development axis of the first methane injector is incident with the development axis of the second hydrogen injector, defining a V configuration.

3. The methane and hydrogen injection device according to claim 2, wherein the single common injection duct is connected with a vertex of the V configuration.

4. The methane and hydrogen injection device according to claim 3, wherein the single common injection duct is straight and a relative development axis lies or coincides with a plane identified by the development axes of the first methane injector and the second hydrogen injector.

5. The methane and hydrogen injection device according to claim 3, wherein an electric connector is associated in each of free ends of the V configuration for connecting an independent electric control wiring of the first methane injector and the second hydrogen injector.

6. The methane and hydrogen injection device according to claim 3, further comprising a first port and a second port intended to be connected to respective distribution ducts respectively of methane and hydrogen, wherein the first and second ports are perpendicular to a plane identified by the development axes of the first methane injector and the second hydrogen injector.

7. The methane and hydrogen injection device according to claim 1, wherein the single common injection duct is made in a body, wherein the single common injection duct is in a single piece with casings of the first methane injector and the second hydrogen injector.

8. A spark-ignition internal combustion engine comprising at least one cylinder having an intake manifold and at least one methane and hydrogen injection device according to claim 1 operatively connected with the intake manifold.

9. The spark-ignition internal combustion engine according to claim 8, further comprising processing means configured to control the first methane injector and the second hydrogen injector by varying a composition of the mixture introduced into the cylinder as a function of at least one operating parameter of the spark-ignition internal combustion engine.

10. The spark-ignition internal combustion engine according to claim 9, wherein the processing means are configured to supply the spark-ignition internal combustion engine with a mixture richer in hydrogen under at least one of the following operating conditions:
1) At minimum
2) In cruising conditions with a torque output lower than a pre-set percentage comprising 35% of a maximum torque output,
3) In conditions of intake air and/or engine coolant temperature below a first predetermined temperature threshold,
4) When a residual quantity of methane is below a second predetermined threshold.

* * * * *